Patented July 13, 1948

2,445,300

UNITED STATES PATENT OFFICE 2,445,300

VIRUS VACCINES

Leslie A. Chambers, Upper Darby, Pa., assignor to The Trustees of the University of Pennsylvania, Philadelphia, Pa., a corporation of Pennsylvania No Drawing. Application December 5, 1941, Serial No. 421,780

10 Claims. (Cl. 167—78)

This invention relates to virus vaccines that elicit in man and other mammal the production of antibodies capable of neutralizing the virus of infectious diseases of man and other mammal, which vaccines contain a complex broadly referred to as a basic-protein-precipitant-animal-infectious-disease virus complex, and also relates to the preparation of the vaccines.

I have found that advantageous virus vaccines effective in the prophylaxis of infectious virus diseases of man and other mammal comprise the antigenic virus of such diseases, either the living virus, fully virulent or attenuated, or the inactivated virus, associated with a basic-protein-precipitant as a so-called basic-protein-precipitant-animal-infectious-disease virus complex or aggregate having a very exceedingly low percentage of sensitizing proteins incapable of eliciting antibody response to the virus, that is, proteins from the medium in which the virus was propagated and which upon injection might produce undesirable disagreeable reactions. These vaccines possess a high antigenic potency higher than that of virus vaccines for the respective diseases, that could be obtained by any of the heretofore known practical means, and, on administration, elicit the production of antibodies capable of neutralizing the virus.

Thus, the expression "antigenic virus" in this specification and the appended claims includes all types and strains of viruses capable in their fully virulent, attenuated or inactivated form of eliciting in man or other mammal the production of antibodies capable of neutralizing the corresponding virus of an infectious disease in man or other mammal.

The method of preparing the vaccines of the invention comprises the step of adding the desired basic-protein-precipitant, in convenient form (e. g. solution, suspension, paste or powder) to a suitable starting material, preferably in liquid form, containing the desired antigenic virus in active, attenuated or inactivated state. The quantity of the basic-protein-precipitant need be only sufficient effectively to form, under the reaction conditions, the amount of complex that could be practically produced from the quantity of virus-containing material employed. Where necessary, the hydrogen ion concentration of the reaction mixture is adjusted to a point to permit the effective precipitation of the complex. The precipitated complex is separated by suitable means such as sedimentation preferably by centrifugal force followed by decantation, and, with or without subsequent washing with suitable washes, the complex may be preserved by suitable means, for example, by vacuum desiccation from the frozen state.

The vaccines may be put up directly from the complex at any of the described stages after its formation, or, depending on the starting antigenic virus-infected material, may involve suitable washing preferably with a solution that does not dissolve the complex, for example, a one percent aqueous solution of protamine or other basic-protein-precipitant, after which the complex is advantageously re-suspended in a solution suitable for injection such as a buffered salt solution. Such re-suspension may be to any desired concentration and advantageously to any higher concentration than that of the virus in the original material in which it was propagated even up to ten times, or more, that concentration. If desired, there may be added to the vaccine any other desired agents such as a suitable preservative, for example, phenyl mercuric nitrate.

Among the suitable basic-protein-precipitants are included especially the basic proteins particularly those relatively simple, basic proteins obtainable from the sperm of fish, such as the protamines, as spermine, salmine, scombrine, cyclopterine, sturine, salmiridine and the like; and also the histones exemplified by thymus histone and the like, and also the globins, for example, globin, the animal protein existing in hemoglobin. Also included are the basic degradation products of the protamines, such as result from hydrolysis progressively, as the protones, the polypeptides and the basic amino acids, exemplified by arginine, histidine, lysine and citrulline. The histone esters or hydrolysates, for example, the hydrolysates of histone obtained by boiling thymus histone in known manner with sulfuric acid and separating the hydrolysate by addition of alcohol, or the esters of histone obtained by introducing hydrogen chloride into a suspension of histone in methanol and adding ether to precipitate the hydrochloride of the ester are also included. Along with the polypeptides may be considered the decarboxylated derivatives thereof referred to as decarboxy-polypeptides, so that both polypeptides and decarboxy-polypeptides may be broadly termed polypeptide substances.

Thus, the expression basic-protein-precipitant is used generically herein and in the claims to embrace broadly the precipitating agents, whether natural or synthetic, capable of precipitating the antigenic virus to form the desired complex or aggregate therewith, and it includes, only by way of example, the basic proteins and basic degradation products of proteins, given hereinabove as illustrative types.

The vaccines of the invention cover broadly those related generally to viruses that cause infectious diseases in man and other mammal, exemplified by, but not restricted to, the viruses of equine encephalomyelitis, yellow fever, rabies, St. Louis encephalitis, canine distemper, influenza and of other common virus diseases of man and other mammal and which viruses are of the antigenic types. The infected starting materials containing the desired antigenic virus may be of any of the known forms in which the virus may be propagated, for example, mouse brain emulsions as in rabies and influenza, horse brain emulsions as in equine encephalomyelitis, tissue cultures as in rabies and yellow fever, fowl embryo emulsions as in equine encephalomyelitis, and fowl egg extra-embryonic fluids (e. g. allantoic and amniotic fluids) as in equine encephalomyelitis and influenza, some of which starting materials, if desired, may be subjected to any of the usual preliminary treatments to eliminate some undesirable components, as, for example, dialysis in the case of fowl egg extra-embryonic fluids to remove dialyzable substances and uric acid, or treatment to attenuate or inactivate the virus. In the latter case, inactivation may be accomplished by any convenient method, for example, physical such as heat, ultra-violet light and the like, or chemical such as with formalin.

The invention may be illustrated by, but not restricted to, the following examples:

Example 1

In spite of their low total protein content, the fluids of the allantoic sac (allantois) and the amniotic sac (amnion) accompanying chick embryos infected with equine encephalomyelitis virus contain large amounts of the active virus. Although these fluids, singly or combined, have a relatively small amount of cellular debris and while dialysis will eliminate therefrom the uric acid along with readily dialyzable substances, nondialyzable substances other than virus, for example egg proteins, remain in the fluids in relatively large amounts. To 100 cc. of untreated allantoic and amniotic fluids containing the animal-infectious-disease, is added about 20 cc. of an aqueous solution containing 10 mg. per cc. of spermine. As the pH is in the neighborhood of 8.0, a precipitate appears immediately, which precipitate is the spermine-equine encephalomyelitis virus complex or aggregate. The precipitate is separated by sedimentation preferably assisted by centrifuging the mixture, for example, in the angle centrifuge at 5000 R. P. M. The supernatant liquid is drawn off. The precipitate (complex) is a yellow to creamy, fibrous, stringy mass, characterized by low solubility in water or salt solutions. Upon re-suspending the complex or aggregate in a buffered physiological saline solution to a volume of 100 cc., there is obtained a solution effective, after suitable attenuation or inactivation, as a vaccine.

Example 2

Twenty cc. of a 1% aqueous solution of protamine is added to 100 cc. of clear extra-embryonic fluid (allantoic and amniotic fluids) containing influenza virus of type B. The pH being about 8.3, a precipitate appears immediately as evidenced by the turbidity showing up in the mixture. The precipitate is then sedimented by centrifugation and the supernatant liquid is decanted, leaving the precipitate which is the protamine-influenza virus complex or aggregate, having the same physical appearance as the aggregate of Example 1. Upon re-suspending the precipitated complex in buffered salt solution to the original volume of 100 cc., the preparation shows approximately the same virus infectivity as the original infected fluid starting material. This buffered salt solution containing the complex is effective, after suitable attenuation or inactivation, as a vaccine.

These examples are merely illustrative of the process of the invention as well as of the basic-protein - precipitant - animal - infectious - disease virus complex or aggregate and of the vaccines of the invention, of which the protamine-animal-infectious-disease virus complex vaccines are especially useful.

While the above examples show the treatment of the infected extra-embryonic fluids directly with the basic-protein-precipitant without any dialysis, it is also possible to carry out the same process and to obtain the same complex and vaccines after the extra-embryonic fluid is first dialyzed to eliminate, for example, the uric acid. In either case, the aggregate may be rid of any occluded dialyzable substances by dialysis after suspending the separated aggregate in a minimum amount of suitable liquid.

While the starting material in the specific examples contained the active, antigenic virus, starting material containing either the attenuated or inactivated form of the desired antigenic virus may be employed yielding with the latter an avirulent vaccine which can also be obtained if the product resulting from the use of an active, antigenic virus, after the precipitation of the complex or aggregate, is inactivated at any subsequent step in the procedure by any convenient method as hereinabove noted.

Since the precipitated complex obtained in the process is readily re-suspended, whenever desired, the complex may be washed one or more times with a liquid in which it does not dissolve, such as an aqueous 1% protamine solution or similar solution of any other basic-protein-precipitant.

While the invention has been illustrated by certain specific embodiments thereof, it is understood that certain substitutions or modifications can be made therein, for in place of the specific type or strain of antigenic virus or the specific basic-protein-precipitant used in the examples, any other suitable type or strain of the antigenic virus or species or type of basic-protein-precipitant or other infected starting material may be employed according to the invention which is intended to be limited to the available scope of the appended claims.

I claim:

1. A virus vaccine eliciting in man or other mammal the production of antibodies capable of neutralizing the corresponding viruses of infectious diseases in man or other mammal, which vaccine comprises a basic-protein-precipitant-animal-infectious-disease virus complex, the virus constituent of which was derived from an antigenic virus of an infectious disease of man or other mammal.

2. An equine encephalomyelitis vaccine eliciting in man or other mammal the production of antibodies capable of neutralizing the corresponding virus of the infectious disease, comprising a basic-protein-precipitant-equine encephalomyelitis virus complex.

3. An equine encephalomyelitis vaccine eliciting in man or other mammal the production of antibodies capable of neutralizing the corresponding virus of the infectious disease, comprising a basic-protein-precipitant-equine encephalomyelitis virus complex, the virus constituent of which was derived from equine encephalomyelitis infected fowl egg extra-embryonic fluids.

4. A yellow fever vaccine eliciting in man or other mammal the production of antibodies capable of neutralizing the corresponding virus of the infectious disease, comprising a basic-protein-precipitant-yellow-fever virus complex.

5. A rabies vaccine eliciting in man or other mammal the production of antibodies capable of neutralizing the corresponding virus of the infectious disease, comprising a basic-protein-precipitant-rabies virus complex.

6. In the preparation of an antigenic virus vaccine eliciting in man or other mammal the production of antibodies capable of neutralizing the corresponding virus of an infectious disease in man or other mammal, the step of mixing a basic-protein-precipitant with a liquid material containing said antigenic virus, whereby there is precipitated therein a basic-protein-precipitant-animal-infectious-disease virus complex.

7. In the preparation of an antigenic virus vaccine eliciting in man or other mammal the production of antibodies capable of neutralizing the corresponding virus of an infectious disease in man or other mammal, the combination of steps comprising mixing a basic-protein-precipitant with a liquid material containing said antigenic virus, whereby there is precipitated therein a basic-protein-precipitant-animal-infectious-disease virus complex and separating said complex therefrom.

8. The preparation of an antigenic virus vaccine eliciting in man or other mammal the production of antibodies capable of neutralizing the corresponding virus of an infectious disease in man or other mammal, which preparation comprises mixing a basic-protein-precipitant with a liquid material containing the antigenic virus at a hydrogen ion concentration adapted to permit effective precipitation of said complex, whereby there is precipitated therein a basic-protein-precipitant-animal-infectious-disease virus complex, separating said complex and desiccating it while retaining its capacity to elicit the production of antibodies capable of neutralizing the virus.

9. The preparation of an antigenic virus vaccine eliciting in man or other mammal the production of antibodies capable of neutralizing the corresponding virus of an infectious disease in man or other mammal, which preparation comprises mixing a basic-protein-precipitant with a liquid material containing the antigenic virus at a hydrogen ion concentration adapted to permit effective precipitation of said complex, whereby there is precipitated therein a basic-protein-precipitant-animal-infectious-disease virus complex, separating said complex and resuspending said complex in a liquid medium suitable for injection.

10. The preparation as in claim 9, wherein the virus, if in active form, is converted at any stage of the procedure to a form other than the active form.

LESLIE A. CHAMBERS.

REFERENCES CITED

The following references are of record in the file of this patent:

UNITED STATES PATENTS

| Number | Name | Date |
|---|---|---|
| 2,076,082 | Hagedorn et al. | Apr. 6, 1937 |
| 2,121,900 | Bischoff | June 28, 1938 |
| 2,161,198 | Reiner | June 6, 1939 |
| 2,204,064 | Beard | June 11, 1940 |

OTHER REFERENCES

"Studies of . . . Rous Chicken Sarcoma I"—Shemin et al., J. Expt'l Med., 72, Dec. 1940, pages 697 to 705.

"Handbuch der Virusforschung"—Doerr et al. (1938), vol. I, pages 449–450.

"Outlines of Biochemistry"—Gortner (1929), pages 361–2.

Journal Am. Med. Assoc., June 21, 1941—pages 2772 and 2773, "Irradiated Antiviral Vaccines," copy in Patent Office Library.